June 9, 1959 R. A. WHITBECK 2,890,004
FISHING TACKLE
Filed June 10, 1955
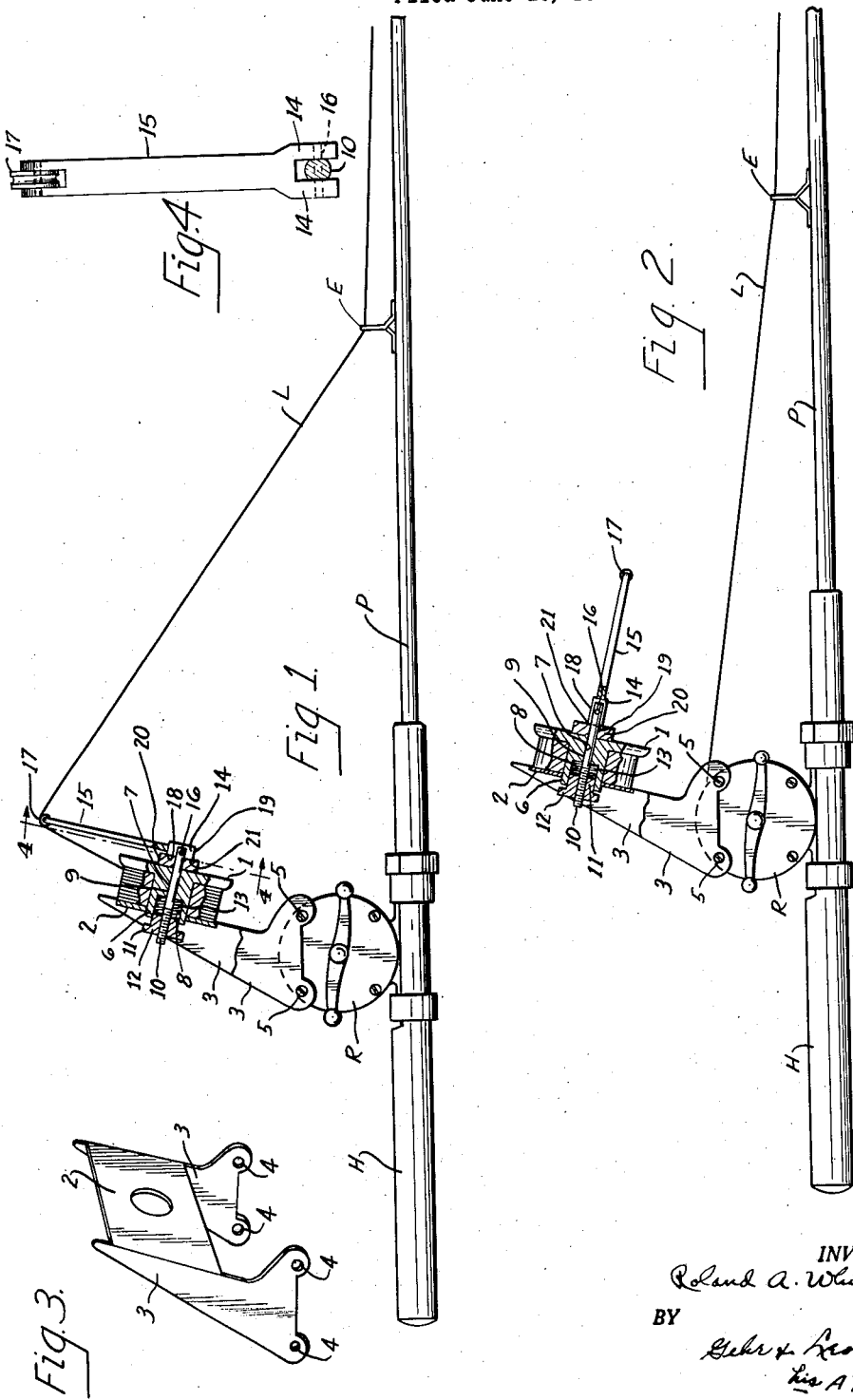
INVENTOR.
Roland A. Whitbeck,
BY
Gehr & Leonards,
his ATTORNEYS United States Patent Office 2,890,004
Patented June 9, 1959

2,890,004

FISHING TACKLE

Roland A. Whitbeck, Lorain, Ohio

Application June 10, 1955, Serial No. 514,671

4 Claims. (Cl. 242—84.1)

This invention relates to fishing tackle and particularly to an improved line check and release device by virtue of which the line is maintained relatively taut during trolling but with a quantity of the line adjacent the reel so arranged that it is instantly released and becomes slack when a pull is exerted on the portion of the line in the water, whereby the slack must be run out before the pull due to a strike is applied to the line on the reel or to the lure.

The advantages of the invention reside in the fact that, when the fish first strikes the bait, the combined force of the fish and trolling pull on the line is not applied instantly to the fish but instead, the fish is afforded an opportunity to swim rather freely with the bait for an interval and thus swallow it sufficiently so that the fish is more likely to be hooked.

Furthermore, this combined force is not applied instantly to the rod and reel, in event of a strike of a large fish or in event of the snagging of the line, but instead the operator is given a warning affording him an interval of time after he is warned within which to bring the reel into play, either to ease off the line in event of a snag or to gradually tighten up on the line in event of a strike.

One of the objects of the present invention is to provide a line check and release device having the advantages described above, yet which does not interfere with normal manipulation of the fishing rod and reel, and which can readily be adjusted so as to release for different degrees of pull on the line.

Various other objects and advantages will become apparent from the following description of the drawings, in which:

Fig. 1 is a side elevation of a handle and adjacent portion of a trolling rod with a reel and a preferred embodiment of the present invention mounted thereon in line checking position;

Fig. 2 is a view similar to Fig. 1 showing the position of the operating parts of the line check and release device after the slack line has been run out and the reel is effective for control;

Fig. 3 is a perspective view showing the attaching brackets by means of which the line check and release device is mounted on a conventional reel; and, Fig. 4 is an enlarged sectional view taken on the line 4—4 in Fig. 1.

Broadly, the line check and release device comprises a spool having a peripheral surface on which a length of fish line can be wrapped and from which the line can be unwound over one end of the spool. The spool is non-rotatably mounted on a support by which it can be held on a fishing rod conveniently near the usual reel carried by the fishing rod. Carried by the support is a supporting finger which normally is in an operative position in which it extends in a direction other than endwise of the spool and in which its free end is disposed so as to re-direct a line passed thereover from the innermost eyelet on the fishing rod to the spool so that the line pulls on the spool predominantly peripherally of the spool so that the line does not unwind over the end of the spool. Since the spool is non-rotatable, a line directed at such an angle cannot unwind over the end of the spool. The finger is arranged to rock from this operative position to inoperative position in which it extends in a direction generally endwise of the spool and with its outer or free end out of the path of the line so that the line can unwind freely over the end of the spool. Resilient means are provided to resist the rocking movement of the finger from operative to inoperative position. A dead center connection is provided so that the spring resists movement of the finger part-way from operative to inoperative position but assists the finger in moving to inoperative position after it has moved a predetermined distance toward that position, thus assuring that the finger will be removed from the position in which it can interfere with the unwinding of the line over the end of the spool.

For compactness and greatest effectiveness the finger is preferably mounted so that its pivoted end is at the axis of the spool and, when the finger is in operating position its free end is disposed at a point considerably beyond the periphery of, but close to the plane of the forward end of, the spool. When the finger is in inoperative position, it is substantially coaxial with the spool.

For the purposes of description, this preferred embodiment of the invention is described in detail hereinafter.

Referring to the drawings, there is shown a fragment of a trolling rod or pole P having a conventional handle H to which the usual fishing reel R is connected in any conventional manner.

The line check and release device comprises a spool 1 which is non-rotatably mounted on a support or bridge member 2 which is part of a bracket by which the spool 1 is connected to the reel. The bracket comprises upright arms 3 between which the bridge 2 is mounted in fixed position. At their lower ends, the arms 3 are provided with holes 4. The arms 3 are adapted to be placed against the outer faces of the opposite ends of the reel R and secured in fixed position on the reel by means of the usual bolts 5 which are customarily provided on the reel for holding it together and which are received through the holes 4.

The peripheral surface of the spool is adapted to have fishing line wound thereon so that the line can unwind readily off of the forward end of the spool.

The spool 1 has a hub 6 which extends through the bridge 2. The spool 1 has an axial bore 7 which extends from the forward end of the spool part-way through the spool where it opens into an enlarged coaxial counterbore 8 which, in turn, is open at the rear of the spool 1 and bridge 2.

Slidably mounted in the bore 7 is a rod 9 which extends entirely through the bore 7 and counterbore 8 and protrudes beyond the outer ends thereof, respectively. The rod is threaded, as indicated at 10, for receiving an adjusting nut 11 which has a hub portion 12 telescopically fitting within the counterbore 8. Interposed between the inner end of the nut 11 and the base of the counterbore 8 is a spring 13 which normally urges the rod 9 toward the rear of the spool to a retracted position.

The forward end of the rod 9 is received between yoke arms 14 of a line guiding finger 15. The arms are pivotally connected to the rod 9 by a pivot 16 for rocking transversely of the spool 1. At its other end the finger 15 is provided with a small guide roller 17 which preferably has a peripheral line retaining groove.

The base portion of the rod has a lateral face 18 and an end face 19 which are disposed at an abrupt angle, preferably 90°, to each other.

On the forward end of the spool is an abutment surface 20 against which the lateral face 18 of the finger 15 is resiliently held by the rod 9 and spring 13 when the finger is in the operative position illustrated in Fig. 1. When the finger is in this position the slack line is re-directed so that adjacent the spool, it extends predominantly peripherally of the periphery of the spool and cannot unwind over the end of the spool. Accordingly, it is retained on the spool 1.

The line L passes through the innermost eye E of the rod over the guide roller 17. An appreciable amount of line is unreeled from the reel R and beginning at the portion nearest the reel is wound around the spool 1 until all of the slack line removed from the reel is taken up, whereupon the line, at a location between the portion so wound and the portion passing through the eye E is laid over the roller 17 which, as mentioned, is conveniently notched so as to prevent lateral displacement of the line therefrom. In this position the device is ready for trolling.

The nut 11 is operated so as to impose the desired pull by the spring 13 on the rod 9 so as to hold the face 18 of the finger 15 against the abutment 20 with a preselected yieldable pressure and thus resiliently to resist rocking of the finger 15 about its pivot 16 from the position shown in Fig. 1 to a position in which it is inoperative and out of the path of the line. In the form illustrated, the inoperative position is that in which the finger is coaxial with the spool.

When a sudden pull occurs on the line L, the line swings the finger 15 about the pivot 16 from the operative position illustrated in Fig. 1, the amount of pull required for this purpose depending upon the setting of the spring 13. The pull required on the upper end of the finger as it swings outwardly and downwardly to the right in Fig. 1 increases until the corner of the intersection of the faces 18 and 19, as indicated at 21, passes a dead center position relative to the pivot. As soon as the intersection passes the dead center position, the spring snaps the finger 15 about the pivot throughout the remainder of the distance so as to dispose it in the inoperative position, illustrated in Fig. 2, in which it is coaxial with the rod 9. When in this inoperative position, the line L can unwind over the forward end of the spool 1 readily.

Thus the operator is warned of a strike or snag in ample time to take the necessary precautions either to relieve the line if he is snagged or gain control of the fish, if a fish is hooked.

It is apparent that, depending upon the circumstances which are likely to occur at the particular fishing site, a wide variation in the amount of slack line which may be accumulated for release and in the amount of pressure or pull required to release it are readily available.

Having thus described my invention, I claim:

1. A fishing line check and release device comprising a spool having a bore extending endwise thereof and an outer peripheral surface surrounding the bore and adapted to have a fish line wound thereon, a rod slidable endwise is the bore, a line supporting finger pivotally connected by one of its ends to one end of the rod for rocking transversely of the rod axis from an operating position in which it extends generally transversely of the spool to an inoperative position in which it extends generally endwise of the spool, a spring yieldably urging the rod in a direction along said bore for moving the connected end of the finger toward the adjacent end of the spool, means on the spool and connected end of the finger engageable with each other and cooperable to resist rocking of the finger against the force of the spring from said operating position to said inoperative position.

2. A line check and release device according to claim 1 characterized in that said last mentioned means comprises a relatively flat surface on the end of the spool, a relatively flat lateral surface on the connected end of the finger and juxtaposed against the flat surface on the spool when the finger is in operative position, and a relatively flat end surface on the connected end of the finger and intersecting said lateral surface on the finger at an abrupt angle.

3. A line check and release device according to claim 2 characterized in that said lateral surface of the finger extends transversely of the rod in a direction endwise of the finger beyond the circumferential limits of the rod when the finger is in operative position.

4. A line check and release device comprising a spool having an axial bore and a coaxial peripheral surface adapted to have a fish line wound thereon and to permit the removal of the line therefrom over one end of the spool, a rod slidable endwise in said bore and extending at one of its ends outwardly beyond the spool at said one end of the spool, a finger pivotally connected at one of its ends to said one end of the rod for rocking movement from an operative position in which the finger extends radially of the spool to an inoperative position in which the finger extends axially of the spool, an adjusting nut on the opposite end of the rod, a compression spring operatively interposed between the nut and the spool for urging the rod endwise of the spool in a direction such as to draw the finger firmly against the said one end of the spool, said connected end of the finger having a flat lateral surface engaging said one end of the spool when the finger is in operative position, and having a flat end surface at said connected end angularly disposed to the lateral surface and engaging said one end of the spool when the finger is in inoperative position.

References Cited in the file of this patent

UNITED STATES PATENTS

| | | |
|---|---|---|
| 2,588,524 | Herbert | Mar. 11, 1952 |
| 2,731,756 | Nelson | Jan. 24, 1956 |

FOREIGN PATENTS

| | | |
|---|---|---|
| 950,630 | France | Mar. 28, 1949 |
| 951,192 | France | Apr. 11, 1949 |
| 987,475 | France | Apr. 18, 1951 |
| 1,094,682 | France | May 23, 1955 |